Jan. 4, 1938.  G. C. SUPPLEE  2,104,681
METHOD OF IRRADIATION
Filed Sept. 21, 1933   2 Sheets-Sheet 1

INVENTOR
GEORGE C. SUPPLEE
BY
ATTORNEY

Jan. 4, 1938.  G. C. SUPPLEE  2,104,681
METHOD OF IRRADIATION
Filed Sept. 21, 1933   2 Sheets-Sheet 2

INVENTOR
GEORGE C. SUPPLEE
BY
ATTORNEY

Patented Jan. 4, 1938

2,104,681

UNITED STATES PATENT OFFICE 2,104,681

METHOD OF IRRADIATION

George C. Supplee, Bainbridge, N. Y., assignor of one-half to The Borden Company, a corporation of New Jersey, and one-half to National Carbon Company, Inc., a corporation of New York Application September 21, 1933, Serial No. 690,410

13 Claims. (Cl. 99—13)

This invention relates to irradiation of various substances with radiant energy and especially with energy having wave lengths corresponding to the visible spectrum and to the ultra-violet.

In the irradiation of various substances it often becomes desirable to produce certain changes or changes in certain ingredients of substances without producing other changes or changes in other ingredients to a corresponding degree. A typical example of this is the irradiation of milk with ultra-violet energy. During this irradiation it is desirable to produce a high degree of biological activation, and especially anti-rachitic activation, without producing a disagreeable flavor or odor. It is an object of my invention to devise a method whereby the radiant energy producing a desirable effect is utilized in a relatively efficient manner while the effect of radiant energy producing a less desirable effect is effective in a very inefficient manner, if at all.

Another object of my invention is to provide a method for utilizing any of the differences in the quality or form of the radiated energy whereby different effects are produced upon the components of the substance being irradiated. As an example of such a change reference is made to the effect of polarization of the energy analogous to the polarization of light. Due to the reflection of this energy at relatively oblique angles the absorbed energy is changed in some respect. This change may possibly be a polarization in a plane different from the plane of polarization of the reflected energy. As another example of such phenomena reference is also made to the unequal reflection of energy of varying wave lengths especially at oblique angles.

Still another object of my invention is to take advantage of the fact that certain changes in the substance are produced at the surface of the irradiated substance while other changes appear to be produced below the surface. I believe that anti-rachitic activation occurs at the surface of the substance, for example milk or whey, being irradiated while changes in the flavor and odor take place below the surface at least to some extent. By causing energy to impinge upon the surface obliquely it is possible to shorten the depth to which the irradiated substance is penetrated. In this way a smaller proportion of the total depth of irradiated substance is affected by the energy impinging obliquely upon it than would be the case if the energy impinged normally upon it.

These and other objects of my invention will be evident from the following specification having reference to the accompanying drawings in which.

Figure 7:
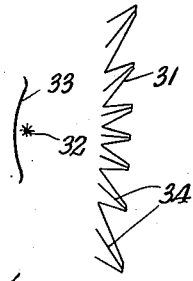
Figure 8:
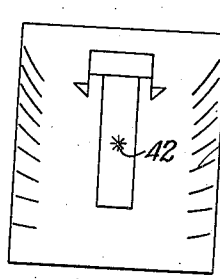
Figure 9:
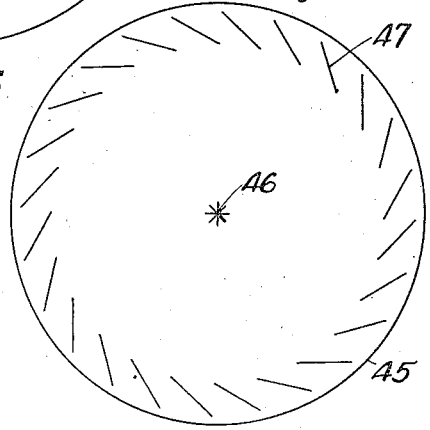

Figs. 7, 8, and 9 are diagrammatic cross sections of another device which I may employ in carrying out my invention; Figs. 7 and 9 being horizontal cross sections and Fig. 8 a vertical cross section.

I have observed that when light or other radiant energy falls on substances at varying angles the relative effects are not the same. For example if milk is irradiated with ultra-violet energy various effects are produced. I have particularly investigated the effect on flavor and odor and the biological activation i. e. the increase in anti-rachitic effect. For the purpose of comparison milk was exposed for a definite time while spread in a thin flowing film to a given source of ultra-violet energy. During some of the tests the central axis of the light beam fell normally or perpendicularly on the film. During other tests the central axis of the light beam fell at quite acute angles such as angles of 15° from parallel (75° from perpendicular); tests were also made at intermediate angles. In all of the tests some of the light rays fell at an angle, but in describing the invention reference will be made to the angle at which the central axis or central pencil of the light beam strikes the film, it being important that none or substantially no light rays strike the film at an angle of 90°. In evaluating the tests the anti-rachitic effect and the organoleptic effect of light falling perpendicularly (90° from parallel) on the film were given an arbitrary value of 100. This does not mean that the anti-rachitic effect having the value of 100 was the greatest which it was possible to give by prolonged exposure. It also does not mean that the organoleptic effect was sufficient to give the milk so pronounced a taste or odor as to unfit it for commercial use. These were simply arbitrary values given to the effects produced by light falling normally upon the film. Other films were treated at different angles. During these treatments the time of exposure was the same, the same source of ultra-violet energy was used and the distance from the center of the film to the source of ultra-violet energy was the same. It was found that when the angle was 30 to 50° from parallel the biological effect or anti-rachitic effectiveness still had the value of 100 but the organoleptic effect or the ability of the rays to produce adverse flavor or odor decreased to a value of from 25 to 35. When the impingement angle was even more oblique, about 15°, the biological effect of the milk thus treated was still nearly 100 whereas flavor and odor development had a relative value of from 5 to 15. Thus it will be noted that by causing the energy to fall very obliquely upon the film of milk it is possible to vary the relative biological and organoleptic effects and that the biological effect is much greater relative to the organoleptic effect when the energy impinges upon the film at a very oblique angle. The angles at which the energy impinges are measured from the surface of the film, or, where the surface is curved, from a plane tangent to said surface. Such angles have, for convenience, been designated as angles from parallel.

The improved result may be due to one or more of the following causes although it is not intended to limit the invention to the particular causes enumerated. It is known that when light is reflected from substances at certain angles the light so reflected is polarized in one plane. It may be assumed that the light not reflected, i. e. absorbed, is polarized, so to speak, in a plane perpendicular to the plane of the polarized reflected light. The biological effect may be produced to a considerable extent by the fact that this energy which is absorbed has undergone some change similar to that of polarization in light.

Another possible theory is that the change is due to the unequal reflection of energy of varying wave lengths especially at oblique angles. I have determined that energy of various wave lengths is reflected in different amounts when the energy impinges at varying angles on a reflector, especially a reflector consisting of a flowing film of milk or similar substance. Since the thickness of the film is such that less than 10% of the ultra-violet energy is transmitted through the film, it is evident that the energy which is not reflected is absorbed. I have found that there is a sharp drop in the amount of energy reflected in the neighborhood of 2850 Å. This indicates an increasing sharp rise in the energy absorbed. Since it is the energy in the region of this wave length which is believed to be very efficacious in biological activation, it appears not improbable that the increased efficiency of the energy having small impingement angles may be due to some extent to the change in reflection with such wave lengths. At the same time the change does not appear great enough to account for the entire difference between biological activation and organoleptic effect.

This change in effect may be due to a difference in the place where the changes are made which give different effects. It may be assumed that the biological activation takes place only at the surface and that organoleptic changes take place both at and below the surface. When the energy falls obliquely on the film of material being irradiated the potential linear path within the substance has the same length but it affects a much thinner layer in the ordinary cases i. e. those in which the film is of such a thickness as to absorb substantially all the energy.

I have accordingly conceived the idea that it would be advantageous if the radiant energy used in the treatment of various substances should fall obliquely upon the substance being irradiated. In case the substance being irradiated is milk, this impingement of the rays at an oblique angle produces a relatively high biological effect in proportion to the flavor and odor effect as compared with the proportionate effects which would be produced if the energy fell at right angles. For this reason I prefer to irradiate milk and the like with energy impinging at an oblique angle. I have found that similar advantageous results are secured in the irradiation of whey and various other components of milk and other substances modified by irradiation. While I have disclosed the use of specific angles to secure desired results, it is within the scope of my invention to vary the angle as may be necessary to secure other results.

Figure 1:
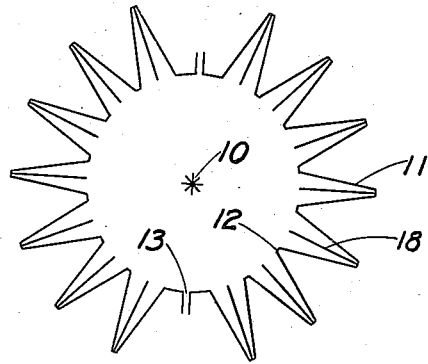
Figure 1 is a diagrammatic horizontal cross section of a device useful for carrying out my invention.
Figure 2:
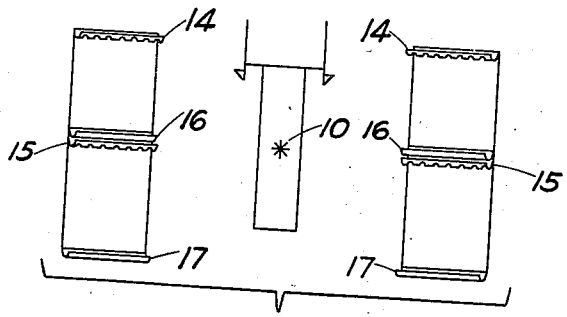
Figure 2 is a vertical cross section of this device.

Numerous forms of apparatus may be employed in carrying out my improved method. I disclose a large number of embodiments of my improved apparatus herein but the method is not limited to any particular form of apparatus. In Figures 1 and 2 I show a type of apparatus well adapted for carrying out my improved process. The device consists of a source of energy 10 surrounded by means over which a film of fluid to be irradiated may be caused to flow. In the particular type shown in Figures 1 and 2 the film forming device is composed of a number of vertically positioned members 11, V-shaped in horizontal section, extending outwardly from a cylinder 12. The cylinder is split at 13 to permit of the cleaning thereof and also replacements and adjustments of the source of ultra-violent energy. The walls of the V-shaped members do not come together, but are provided with a flat or rounded surface near their vertices in order that they may be easily cleaned. The liquid to be irradiated is supplied to the top of these surfaces and is allowed to flow downwardly under the influence of gravity. While the milk may flow the entire height of the film-forming means, I have found it convenient to use a device having two or more times the height necessary to give the fluid the necessary period of irradiation. In this manner I am enabled to treat two streams or more of fluid simultaneously with a single source of energy. In carrying out this treatment of two streams simultaneously I provide a distributing member 14 at the top and a similar distributing member 15 half way down. Collecting members 16 and 17 are provided, one of these being located just above the lower distributing means and the other one at the bottom. The fluid being treated thus flows from 14 to 16 or from 15 to 17 and two streams are irradiated at the same time. The V-shaped members are disposed with their vertices away from the source of ultra-violet energy and this energy falls obliquely upon the films on the walls. The angle of impingement of the beam of energy may be selected to give any particular desired effect. It is to be understood ordinarily no fluid would be passed over the flat spaces at the vertices of the V-shaped members or at the surfaces connecting the bases. This can easily be provided for by making blank spaces in the distributing members 14 and 16. Thus all the fluid is irradiated with energy which impinges obliquely thereon. In certain cases the amount of energy reflected from one surface of the V-shaped member to the opposite surface may be sufficient to cause an undesirable flavor or odor in case of milk. If positive protection is required to prevent the reflection from one surface normally onto an adjacent surface baffles of non-reflecting materials may be provided such as shown at 18 in Figure 1.

Figure 3:
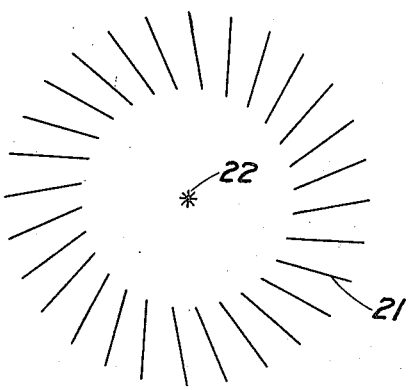
Fig. 3 is a diagrammatic horizontal cross section of another device useful for practicing my invention.

In addition to the form of irradiating device shown in Figures 1 and 2 it is possible to employ a plurality of separate surfaces as shown in Figure 3, which is a diagrammatic horizontal section of another type of irradiation device. In this type of device a plurality of surfaces 21 are arranged about a light source at such an angle that the radiation will fall obliquely on the film of milk flowing downwardly over the screens. The surfaces are so placed that the outer edge of the effective area of each surface is just clear of the shadow cast by the inner edge of the adjacent screen.

The milk or other fluid to be irradiated flows downwardly over the surface under the influence of gravity. The milk may travel downwardly over the entire area, the surfaces being supplied at the top by a suitable distributing means or different streams of milk in parallel may flow over different portions of the surfaces as shown in Figure 2. Normally the surfaces are so arranged that one passing of the milk over a surface gives sufficient irradiation.

Figure 4:
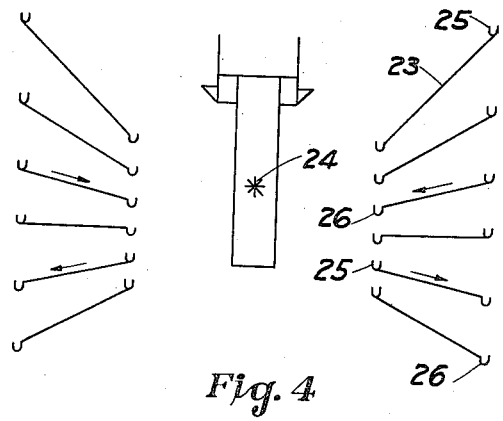
Figure 4 is a diagrammatic vertical cross section of still another device useful for carrying out my invention.

In addition to forms of irradiating devices in which the milk flows downwardly over vertical boards or screens which are so positioned with respect to vertical radial planes passing through the source of illumination that energy falls obliquely on the film, I may make provision for surfaces which are not vertical and in which the desired oblique impingement of the radial energy is secured by arranging the surfaces at the proper angle with respect to the horizontal. Thus in Figures 4 and 5 I show a device useful in practicing my invention constructed to obtain the desired effects in the manner set forth above. In this device a plurality of frustrums of cones are provided. These conical members which are designated as 23 are arranged about a source of radiant energy 24. In those members which are not considerably below the source of energy the vertex is pointing downward. In those which are considerably below the source of energy the vertex is pointing upward. In this manner it is provided that the energy emitted at 24 impinges obliquely upon the surface of the film on the members 23. The fluid to be irradiated is supplied at the upper part of the members 23 by suitable distributing means 25 and is collected by suitable collecting means 26. It should be noted that in some cases the distributing means is at the outside of the device and the collecting means inside but in certain other cases this is reversed. The purpose of this is of course to provide for the flow of the liquid being irradiated under the influence of gravity at all times. It is to be noted in certain cases the path of travel of the liquid being irradiated is greater than the others. Thus because the inclination of some of the irradiated surfaces is greater than in others, consequently the liquid will flow faster over these. In such cases the path of travel is made longer in order that the total time or irradiation may be approximately the same. However, should it be desired to compensate for the varying distance from the source of energy we may make the upper and lower surfaces slightly longer to give the fluid flowing over the surfaces a slightly greater period of irradiation.

Figure 5:
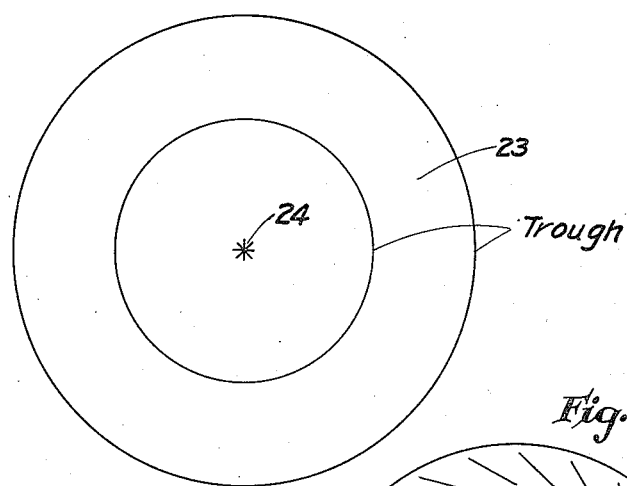
Figure 5 is a horizontal cross section of this device.
Figure 6:
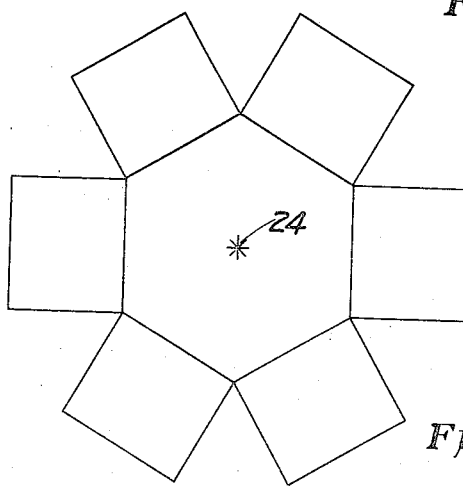
Figure 6 is a horizontal cross section of a modification of the device shown in Figures 4 and 5.

Although the surfaces are preferably made with a conical shape as shown in Figure 5 it is possible to make them of a plurality of plates as shown in Figure 6. Here part of the radiation may be wasted but the construction of the device is simplified.

While I have shown devices for practicing my invention in which the source of ultra-violet energy is completely surrounded by means for forming a film or thin layer of substance to be irradiated, my invention is not so limited. In Figure 7 I show a cross section of a device useful in connection with my invention. In this form the surfaces over which the fluid to be irradiated flows consists of a number of vertically arranged sections 31 which are so placed with respect to a source of radiant energy 32 that energy from the source falls obliquely on the film of material to be irradiated on the surfaces 31. In order to utilize all the energy emitted by the source 32 a reflector 33 is provided. I may also provide a series of baffles 34 to prevent reflected energy from impinging perpendicularly upon the film of fluid being irradiated. However I do not regard this as necessary in most cases. I have conducted experiments on the use of reflected energy and have found the relative results to conform fairly well to those obtained when direct rays are utilized, and when the degree of intensity of the reflected rays is taken into account.

My invention may be used with reflected energy. Thus in Figure 8 I show a vertical cross section of a device for utilizing reflected energy. The substance to be irradiated is formed in thin layers on a surface 41 which is conveniently cylindrical. The source of energy is at 42. The energy is reflected by a plurality of reflectors 43 onto the surface 41. In the device shown the reflected energy impinges obliquely upon the irradiated substance. While I prefer to use this construction I do not regard it as absolutely necessary in cases where the energy strikes the reflecting surface obliquely. It is to be understood that the irradiating surface is provided with distributing and collecting means for supplying the fluid thereto and collecting it therefrom and that the reflecting surfaces are spaced from the irradiating surface substantially to permit an unobstructed flow of the fluid to be irradiated between the irradiating surface and the reflecting surface. In Figure 9 I show another form of device for utilizing reflected energy. In this arrangement I utilize a cylindrical irradiating surface 45 surrounding a source of energy 46. A plurality of vertical plates 47 serve as reflecting surfaces for reflecting the energy onto the fluid on the irradiating surface. It will be noted that in the embodiments shown in Figures 8 and 9 the reflecting surfaces serve as screens for preventing the impingement of unreflected energy on the irradiating surface.

In using the term liquid milk product in the appended claims it is intended to include normal whole milk and also other liquid components of milk which are biologically activatable by ultra violet energy to increase the antirachitic potency of the product.

No claim is made in the application to the various devices shown and described since these are the subject matter of copending application Serial No. 134,286 filed April 1, 1937.

I claim:

1. Method for irradiating milk with ultra-violet energy which comprises impinging ultra-violet energy upon the surface of the milk in such a manner that the angles of incidence of most of the rays of energy impinging on the milk are between 30° to 50° from parallel, and none of them impinge normally thereon.

2. A method of irradiating liquid milk products with ultra violet energy to give increased antirachitic potency without a corresponding increase in undesirable organoleptic effect which comprises impinging ultra violet energy on the surface of the milk product in such a manner that all rays of energy impinge obliquely upon the surface.

3. A method of irradiating liquid milk products with ultra violet energy to give increased antirachitic potency without a corresponding increase in undesirable organoleptic effect which comprises impinging ultra violet energy on the surface of the milk product in such a manner that all rays of energy impinge obliquely upon the surface, and substantially all impinge at angles less than 60° from the parallel.

4. A method of irradiating liquid milk products with ultra violet energy to give increased antirachitic potency without a corresponding increase in undesirable organoleptic effect which comprises impinging ultra violet energy on the surface of the milk product in such a manner that all rays of energy impinge obliquely upon the surface and at least about 85% of said rays are between 15° and 60° from the parallel.

5. A method of irradiating liquid milk products with ultra violet energy to give increased antirachitic potency without a corresponding increase in undesirable organoleptic effect which comprises impinging ultra violet energy on the surface of the milk product in such a manner that all rays of energy impinge obliquely upon the surface and at least about 85% of said rays are between 30° and 60° from the parallel.

6. A method of irradiating liquid milk products with ultra violet energy to give increased antirachitic potency without a corresponding increase in undesirable organoleptic effect which comprises impinging ultra violet energy on the surface of the milk product in such a manner that all rays of energy impinge obliquely upon the surface, and substantially all of the rays are between about 15° and about 60° from the parallel.

7. A method of irradiating liquid milk products with ultra violet energy to give increased antirachitic potency without a corresponding increase in undesirable organoleptic effects which comprises impinging the ultra violet energy directly from its source upon a flowing film of said milk product in such a manner that all of the directly impinging rays of energy impinge obliquely on the surface of the film.

8. A method of irradiating liquid milk products with ultra violet energy to give increased antirachitic potency without a corresponding increase in undesirable organoleptic effect which comprises impinging the ultra violet energy upon a film flowing under the influence of gravity over a substantially vertical surface in such a manner that all of the rays of energy impinge obliquely upon the surface of the film.

9. A method of irradiating liquid milk with ultra-violet energy to give increased antirachitic potency without a corresponding increase in undesirable organoleptic effect which comprises impinging ultra-violet energy on the surface of the milk in such a manner that all rays of energy impinge obliquely on the surface.

10. Method as set forth in claim 5 in which the substance being irradiated is milk.

11. Method as set forth in claim 8 in which the substance being irradiated is milk.

12. A method of irradiating liquid milk with ultra-violet energy to give increased antirachitic potency without a corresponding increase in organoleptic effect which comprises impinging the ultra-violet energy upon a film flowing under the influence of gravity over a substantially vertical surface in such a manner that all of the rays of energy impinge obliquely on the surface of the film and at least about 85% of said rays are between 15° and 60° from the parallel.

13. Method as set forth in claim 7 in which the substance being irradiated is milk.

GEORGE C. SUPPLEE.